US012732345B2

(12) United States Patent
Palmin et al.

(10) Patent No.: US 12,732,345 B2
(45) Date of Patent: Sep. 8, 2026

(54) CONTROL SYSTEM FOR A TECHNICAL INSTALLATION AND METHOD FOR TRANSFERRING A CERTIFICATE REQUEST OF AN INSTALLATION COMPONENT

(71) Applicant: Siemens Aktiengesellschaft, Munich (DE)

(72) Inventors: Anna Palmin, Karlsruhe (DE); Marwin Madsen, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 89 days.

(21) Appl. No.: 18/574,446

(22) PCT Filed: Jun. 28, 2022

(86) PCT No.: PCT/EP2022/067750
§ 371 (c)(1),
(2) Date: Dec. 27, 2023

(87) PCT Pub. No.: WO2023/275058
PCT Pub. Date: Jan. 5, 2023

(65) Prior Publication Data

US 2024/0323001 A1 Sep. 26, 2024

(30) Foreign Application Priority Data

Jun. 29, 2021 (EP) .................................... 21182334

(51) Int. Cl.
*H04L 9/08* (2006.01)
*H04L 9/32* (2006.01)

(52) U.S. Cl.
CPC .......... *H04L 9/0825* (2013.01); *H04L 9/3268* (2013.01)

(58) Field of Classification Search
CPC .... H04L 9/9825; H04L 9/3268; H04L 9/0825
See application file for complete search history.

(56) References Cited

U.S. PATENT DOCUMENTS 5,745,574 A 4/1998 Muftic
2005/0069136 A1* 3/2005 Thornton ................ H04L 63/20 380/277
2009/0319783 A1* 12/2009 Thornton .............. H04L 9/3271 713/156
2011/0154024 A1* 6/2011 Ignaci ................. H04L 63/0823 713/156
2011/0213965 A1* 9/2011 Fu ....................... H04L 63/0823 709/248
2011/0213966 A1* 9/2011 Fu ....................... H04L 63/0807 726/10
2016/0112406 A1 4/2016 Bugrov et al.
2017/0366537 A1* 12/2017 Bose ................... H04L 63/0823
2018/0323977 A1* 11/2018 Hojsik .................... H04L 67/12
2020/0044869 A1* 2/2020 Lutz ........................ G06F 21/33
2020/0092115 A1* 3/2020 Palmin ................ H04L 67/1001
2020/0204381 A1* 6/2020 Meyer ................. G06F 9/45558
2021/0067352 A1* 3/2021 Fynaardt ............... H04W 12/06
2021/0226802 A1* 7/2021 Zhu ....................... H04W 12/06

FOREIGN PATENT DOCUMENTS

EP 3258662 12/2017
EP 3734478 11/2020
JP H10105612 4/1998
JP 2006270646 10/2006
JP 2007328411 12/2007
JP 2020022165 2/2020

OTHER PUBLICATIONS

PCT International Search Report dated Sep. 29, 2022 based on PCT/EP2022/067750 filed Jun. 28, 2022.
Brockhaus, H. et al."Certificate Management Protocol (CMP) Updates draft-ietf-lamps-cmp-updates-10; draft-ietf-lamps-cmp-updates-10.txt"; Certificate Management Protocol (CMP) Updates draft-ietf-lamps-cmp-updates-10; draft-ietf-lamps-cmp-updates-10.txt; Internet-Draft: Lamps Working Group, Internet Engineering Task Force, IETF; Standard; No. 10, pp. 1-54, May 4, 2021.

* cited by examiner

*Primary Examiner* — Darshan I Dhruv
(74) *Attorney, Agent, or Firm* — Cozen O'Connor

(57) ABSTRACT

A control system for a technical installation, particularly a process or manufacturing facility, includes a computer-implemented registration service that is configured to receive a certificate request from a component of the technical installation that comprises information regarding the identity of the installation component, configured to extract from a first memory information about which certificates of the installation component have already been assigned, can be assigned or are to be assigned, using the information regarding the identity of the installation component and the information about certificates that can be assigned or are to be assigned, configured to determine what the certificate request type is and which registration authority or certification authority of the technical installation is responsible for the certificate request, and is configured to transfer the certificate request of the installation component with information about the type of certificate request to the responsible registration authority or the responsible certification authority.

22 Claims, 1 Drawing Sheet

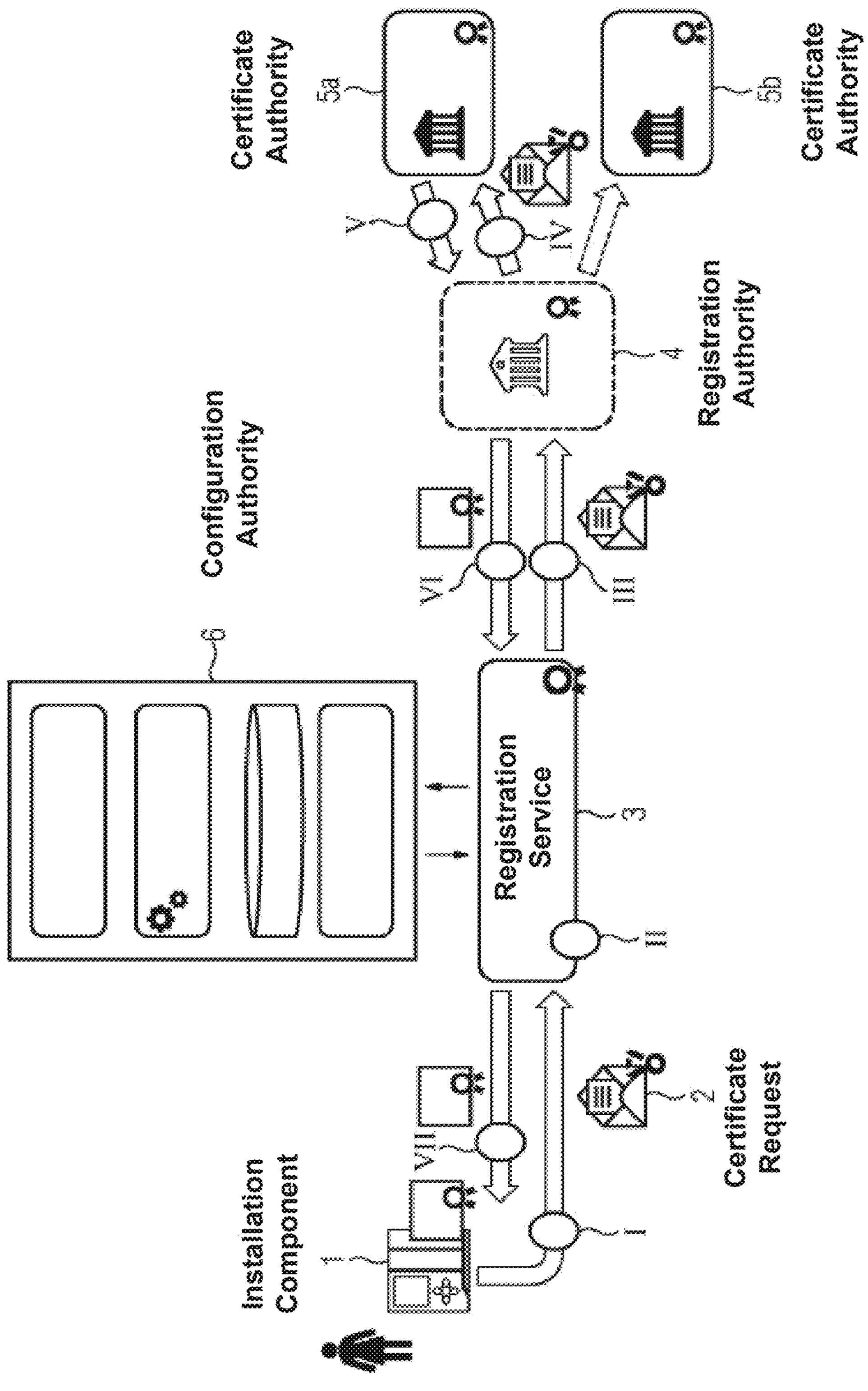
Certificate Authority
5a
Certificate Authority
5b
V
IV
Registration Authority
4
Configuration Authority
6
VI
III
Registration Service
3
II
Installation Component
1
VII
I
2
Certificate Request

CONTROL SYSTEM FOR A TECHNICAL INSTALLATION AND METHOD FOR TRANSFERRING A CERTIFICATE REQUEST OF AN INSTALLATION COMPONENT

CROSS-REFERENCE TO RELATED APPLICATIONS

This is a U.S. national stage of application No. PCT/EP2022/067750 filed 28 Jun. 2022. Priority is claimed on European Application No. 21182334 filed 29 Jun. 2021, the content of which is incorporated herein by reference in its entirety.

BACKGROUND OF THE INVENTION

1. Field of the Invention

The invention relates to control system for a technical installation, in particular a process or manufacturing installation, relates to a method for transferring a certificate request from an installation component of the technical installation, in particular a process or manufacturing installation, and relates to the use of a control system to operate the technical installation.

2. Description of the Related Art

As a result of the growing need for protection (due to the increasing use of open IT standards and protocols) and the requirements of International Electrotechnical Commission (IEC) standard 62443 as the leading industrial security standard, it is increasingly necessary to safeguard the communication connections in control systems of technical installations, i.e., to protect them as appropriate against unauthorized access.

An appropriate protection can particularly comprise, depending on the results of a threat and risk analysis (TRA), the encryption and/or the authentication of the data that is transmitted. Corresponding encryption and authentication mechanisms are normally included in secure communication protocols (for example, Transport Layer Security (TLS), Open Platform Communications Unified Architecture (OPC UA)). The deployment of secure communication protocols requires the communication participants to have digital certificates.

The certificates, which are deployed in an operational environment (for example, an industrial installation) in order, for example, to allow secure communication or user authentication, are normally referred to as operational certificates (OC). For security reasons, it is recommended to employ a dedicated operational certificate for each communication protocol in use. This means that if an installation component employs, for example, OPC UA to safeguard one communication relationship and TLS to safeguard another communication relationship, where the component will require respectively an OPC UA certificate and a TLS certificate (for the TLS server or the TLS client authentication). If the quantity of installation components and therefore the number of operational certificates required is small, then the certificates can be imported into the installation components manually.

An increasing number of installation components are involved in secure communication relationships and require diverse certificates. Consequently, it is beneficial to automate the issuing of operational certificates, based on the certificate requests (CR) that are generated by the installation components, and the assignment of the issued certificates to the components. Such automated certificate management normally requires the availability of a public key infrastructure (PKI) in the respective operational environment (for example, an industrial installation).

A conventional procedure for requesting and issuing the operational certificates can be described as follows: The installation components send their certificate requests or certificate signing requests (CSR) to the registration authority (RA), which validates the requests (by consulting a memory or inventory to check whether the respective component is allowed to obtain a certificate) and then forwards the certificate requests, signed with their own private key, to the responsible certification authority (CA), also referred to as the "issuing CA".

The certification authority checks the signature accompanying the certificate requests using the existing public key of the registration authority. The certification authority then issues the certificates and transfers them to the registration authority, which then checks their validity and forwards them to the requestor component.

In order for the installation components and the components of the relevant public key infrastructure to be able to "understand" each other as clearly as possible, certificate management protocols (CMP) as per RFC 4210 or the "Lightweight CMP Profile", for example, are being implemented in these components with increasing frequency. Using such protocols, it is possible to distinguish between various scenarios (for example, an initial request of an operational certificate for a specific purpose or the request of a renewal of an operational certificate which already exists for a specific purpose). Such protocols are also suitable for requesting various types of certificates, because in most cases it is advisable, before the request of application-specific operational certificates, to equip the installation components with the installation-based customer device certificates (CDC) that link the components to the customer installation (in the same way as an employee identity card links the employees to a company), and then to employ these as a basis for the request of an operational certificate.

For example, when using the CMP protocol and the associated CRMF format, the CDC request occurs using the CMP message type "Initial Request". For subsequent requests of required operational certificates, the CMP message type "Certificate Request" is used, while the renewal of a CDC or an OC occurs using the CMP message type "Key Update Request" (kur), where the respective request is signed using the certificate that is to be renewed (more precisely the associated private key) and containing the ID (for example, the serial number) of the certificate and, if necessary, also the name of the destination certification authority (as a value for the "Recipient" parameter). It is consequently possible to automate all of the above cited scenarios completely, without any user involvement.

As a result of implementing intelligent certificate management protocols, the installation components must become more intelligent in order that they can themselves decide whether an operational certificate (or more precisely the associated key pair) must now be renewed (because the operational certificate will shortly expire), or whether an operational certificate should be revoked for a given reason. In existing industrial installations, which are usually configured heterogeneously with regard to the mechanism used for certificate management, most of the industrial terminals only support the simplest certificate mechanisms (if any) and can themselves only generate for example a certificate request relating to a key pair (this being self-generated or generated by another proxy entity) in a PKCS #10 format as per RFC 2986, or have such a certificate request generated (by proxy) by a user (for example, using OpenSSL).

Such a certificate request, signed with a private key, together with the associated public key can be transferred (for example, in the form of a PEM file) to a certification authority via any chosen transport means (for example, on a USB stick). The certification authority thereupon issues, based on the certificate request, a certificate that contains inter alia the information relating to the applicant, as included in the certificate request, and its public key.

The certificate can likewise be delivered via various mechanisms to the requestor, who then validates this as per RFC 5280 and in this way checks inter alia whether the public key is correct (thereby producing a "proof of possession") and whether specific certificate contents (in particular a "Distinguished Name") correspond to the contents of the request.

Scenarios of greater complexity (for example, requesting operational certificates based on a CDC or requesting a CDC/OC renewal) cannot currently be implemented using "simpler" formats, such as PKCS #10 (or not without involvement of the user), for the reasons stated above. However, the probability of unintentional or deliberate error is increased as a result of user involvement. The normal operation and the availability of the industrial installation may be jeopardized thereby.

Even if no errors occur, the risk of delays can be greatly increased due to the manual intervention required.

If a certificate request is now created in the (common) PKCS #10 format by an installation component itself or (by proxy) by a user and is not transmitted using an intelligent certificate management protocol (for example, CMP), but by a simpler mechanism, such as on a USB stick, such a request does not usually contain an indication whether this request is an initial request or an update of a certificate (for example, a CDC or an operational certificate).

Likewise, the possibly predetermined sequence in which specific certificates must be requested in an installation cannot be directly indicated in a certificate request of this type. Consequently, such certificate requests can only be interpreted as initial certificate requests by a registration authority or certification authority. In particular, if there is a plurality of certification authorities, then a registration authority cannot, based on the contents of the certificate request, decide which certification authority this certification request is intended for.

EP 3 258 662 A1 discloses a method for registering an intelligent electrical device with a certification authority.

U.S. Pat. No. 5,745,574 A discloses a security infrastructure with a plurality of certification authorities.

SUMMARY OF THE INVENTION

It is an object of the invention to provide a control system for a technical installation, via which certificate management for simple installation components of the technical installation is made significantly easier and is organized more securely.

This and other objects and advantages are achieved in accordance with the invention by a registration authority for a control system of a technical installation, in particular a manufacturing or process installation, by a method for transferring a certificate request from an installation component of the technical installation, in particular the process or manufacturing installation, and by a use of the control system.

An inventive control system for a technical installation has a computer-implemented registration service which is configured to:

receive a certificate request from an installation component of the technical installation, where the certificate request comprises information regarding an identity of the installation component, extract, from a first memory, information about which certificates of the installation component have already been assigned, can be assigned and are to be assigned, determine, based on the information regarding the identity of the installation component and the information about the certificates that can be assigned or are to be assigned, the type of the certificate request and which registration authority or which certification authority of the technical installation is responsible for the certificate request, and transfer the certificate request of the installation component, with information about the type of the certificate request, to the responsible registration authority or the responsible certification authority.

The technical installation can be an installation from the process industry such as a chemical, pharmaceutical, petrochemical installation or an installation from the food and drinks industry. This also includes any installations from the production industry, factories, in which. for example. cars or goods of all types are produced. Technical installations that are suitable for implementing the inventive method can also be found in the field of energy generation. Wind turbines, solar installations, or power stations for generating energy are likewise included in the term technical installation.

In the present context, a control system is understood to mean a computer-based technical system which comprises functionalities for representing, operating and controlling a technical manufacturing or production installation. The control system can also comprise sensors for determining measured values as well as various actuators. The control system can additionally comprise process-oriented or manufacturing-oriented components that are used to drive the actuators or sensors. In addition, the control system can have inter alia devices for visualizing the technical installation and for the purpose of engineering. The term control system also encompasses further computing units for closed-loop controls of greater complexity and systems for data storage and data processing.

A certificate is understood to be a digital data record that certifies specific properties (in this case of machines, devices, applications and the like). An authenticity and integrity of the certificate can usually be verified via cryptographic methods.

The certificate request can be an initial request of an installation component, i.e., a first attempt, to obtain a certificate from the certification authority (for example, in order to be able to communicate with other installation components of the technical installation). The certificate request can, however, also be a request to renew a previously issued certificate whose validity has expired or whose expiry is imminent.

The certificate request comprises at least information about an identity of the requesting installation component. The registration service uses this information and retrieves, from a memory, information about which certificates of the installation component have already been assigned, can be assigned (if any) and are to be assigned. By associating the information regarding the identity of the installation component and the information retrieved from the memory, the registration service can determine the type of the certificate request. In other words, it therefore knows whether this is an initial certificate request or a certificate renewal. In addition to this, the registration service is configured to use the previously determined information to determine which registration authority (RA) or which certification authority (CA) of the technical installation is responsible for the certificate request.

The registration service adapts the certificate request of the installation component accordingly, using the information about the type of the certificate request, and transfers the certificate request to the responsible registration authority or the responsible certification authority of the technical installation. With the registration service of the control system, certificate requests or "raw data" received in a rudimentary format (for example, the PKCS #10 format), from which the essential information relating to the identity of the requestor can be extracted (for example, a name or an ID that may be available in the form of, for example, a serial number or a product instance URI), can therefore be adequately converted and forwarded to the correct recipient.

By virtue of the registration service, the inventive control system also allows an installation component to send its certificate requests directly to the responsible certification authority (without the need for resource-intensive manual intervention by administrators of the technical installation).

The registration service can be computer-implemented on a component of a public key infrastructure such as a local registration authority. It can, however, also be computer-implemented on a terminal of the technical installation, in particular on a network component such as a switch or a firewall component. The term "public key infrastructure" (PKI) refers to a security infrastructure for a technical installation that provides services for a secure exchange of data between communication partners of the technical installation. The public key infrastructure allows certificates to be issued, distributed and checked.

In an advantageous embodiment of the invention, the registration service has/includes relationships of trust with the installation component and with the registration authority or authorities and/or certification authority or authorities of the technical installation, where relationships of trust are preferably certificate-based. The registration service can therefore perform the previously explained conversion and forwarding services securely and efficiently.

The registration service is preferably configured to extract, from the first memory or a second memory, the information about which registration authority or which certification authority of the technical installation is responsible for the certificate request. The information about the responsibilities can be extracted from the same (first) memory as also contains, as explained above, the information about which certificates of the installation component are assigned, can be assigned and are to be assigned. The information about the responsibilities can, however, also be stored in a second memory. Both the first and the second memories can be located (physically) within the technical installation. It is, however, also possible for the first and/or the second memory to be realized in a cloud-based environment (physically outside the technical installation).

The first and/or the second memory can most preferably be implemented on a component of a public key infrastructure, in particular a registration authority, on an engineering station server or on an operator station server of the control system, or on a terminal of the technical installation, in particular a network component or an automation device.

In this context, an "engineering station server" is understood to be a server which is configured to create, manage, archive and document various hardware and software projects for a control system of a technical installation. Using a special software engineering toolset in conjunction with ready-made modules and plans, it is possible via the engineering station server to plan and manage interactions between control technology devices and entities of the technical installation.

One example of this is a SIMATIC Manager Server from the company SIEMENS.

In this context, an "operator station server" is understood to be a server which centrally captures data from an operator control and monitoring system, usually together with archives of alarms and measured values from a control system of a technical installation, and makes this data available to users. The operator station server normally establishes a communication connection to automation systems of the technical installation and forwards data from the technical installation to so-called clients, which are used for the operator control and monitoring of the operation of individual functional elements of the technical installation. The operator station server can include client functions in order to access the data (archives, reports, tags, variables) of other operator station servers.

This means that images relating to operation of the technical installation on the operator station server can be combined with variables from other operator station servers (server-to-server communication). The operator station server can be, but is not necessarily, a SIMATIC PCS 7 Industrial Workstation Server from the company SIEMENS.

Automation devices are used for the purpose of realizing automation and can be, for example, programmable logic controllers that provide a higher-level control function for lower-level programmable logic controllers.

The objects and advantages in accordance with the invention are also achieved by a method for transferring a certificate request from an installation component of a technical installation, in particular a process or manufacturing installation, which has a computer-implemented registration service, to a registration authority or a certification authority of the technical installation. The method comprises:

receiving, via the registration service, a certificate request from an installation component of the technical installation, where the certificate request comprises information regarding an identity of the installation component, extracting, via the registration service, information from a first memory about which certificates of the installation component can be assigned and are to be assigned, determining, via the registration service, based on the information regarding the identity of the installation component and the information about the certificates that have already been assigned, can be assigned or are to be assigned, the type of the certificate request and which registration authority or which certification authority of the technical installation is responsible for the certificate request, and transferring, via the registration service, the certificate request of the installation component together with information about the type of the certificate request to the responsible registration authority or the responsible certification authority.

The objects and advantages in accordance with the invention are also achieved by the use of a control system as explained above for the purpose of operating a technical installation, in particular a manufacturing or process installation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The previously described properties, features and advantages of this invention and the manner in which these are achieved become clearer and are easier to understand in the context of the following description of the exemplary embodiment, which is explained in detail with reference to the drawing, in which:

The FIGURE shows an illustration of the method in accordance with the invention.

DETAILED DESCRIPTION OF THE EXEMPLARY EMBODIMENTS

A method in accordance with the invention is schematically illustrated in the FIGURE. In a first step (I), an installation component 1 submits a certificate request 2 in the PKCS #10 format. A registration service 3 of a control system of a technical installation receives the certificate request 2 of the installation component 1. The registration service 3 has/includes certificate-based relationships of trust with a registration authority 4 and with two certification authorities 5*a*, 5*b* of the technical installation.

The registration service 3 extracts information regarding the identity of the installation component 1 from the certificate request 2. The registration service 3 then accesses a configuration memory 6 that is implemented in the technical installation, in order to extract information about which certificates of the installation component 1 have already been assigned, can be assigned and are to be assigned. The registration service 3 also retrieves, from the configuration memory 6, information about which registration authority 4 or which certification authority 5*a*, 5*b* of the technical installation is responsible for the certificate request 2. The configuration memory 6 is implemented on an engineering station server of the control system, in this case. The various certification authorities 5*a*, 5*b* can each be responsible for different types of certificates.

The registration service 3 now uses the information retrieved from the configuration memory 6 to transform the certificate request 2 from the rudimentary PKCS #10 format into a more comprehensive format (for example the CMP protocol), which includes the type of the certificate request 2 (step II). The criteria for the transformation of the certificate request can be preset by an administrator of the technical installation or similar, or adaptively by a self-learning system.

In a following step (III), the more comprehensive certificate request 2 is forwarded to the registration authority 4, which forwards the certificate request 2 in a further step (IV) to the certification authority 5*a* responsible in this case.

Once the certificate request 2 has been checked and the requested certificate has been issued, the issued certificate is routed to the requesting installation component 1 in following steps (V, VI, VII).

Any involvement of the user in the conversion of the certificate requests is no longer necessary as a result of the technical features explained above. Consequently, the associated risks, as described in the introduction, are likewise removed. The invention can therefore contribute to improved automation of the certificate management in a technical installation, to an uninterrupted normal operating mode, and to improved availability of heterogeneous technical installations.

Although the invention is illustrated and described in detail above with reference to the preferred exemplary embodiment, the invention is not limited by the examples disclosed, and other variations may be derived therefrom by a person skilled in the art without departing from the scope of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A control system for a process installation, the control system comprising:

- an engineering station server including a processor and memory;
- an operator station server including a processor and memory;
- functionalities for representing, operating and controlling the process installation; and
- a computer-implemented registration service;
- wherein the computer-implemented registration service is configured to automatically:
  - receive a certificate request from an installation component of the process installation, said certificate request comprising information regarding an identity of the installation component;
  - extract, from a first memory, information about which certificates of the installation component have already been assigned, are assignable and are to be assigned;
  - determine, based on a linking of the information regarding the identity of the installation component and the information, extracted from the first memory, about the certificates which are assignable or are to be assigned, a type of the certificate request and which registration authority or which certification authority of the process installation is responsible for the certificate request; and
  - transfer the certificate request of the installation component, with information about the type of the certificate request, to the responsible registration authority or the responsible certification authority, the registration service utilizing the information extracted from the first memory to transform the certificate request from a rudimentary format into a more comprehensive format which includes a type of the certificate request;

wherein the computer-implemented registration service routes an issued certificate to the requesting installation component of the process installation subsequent to a check and issuance of the certificate request.

2. The control system as claimed in claim 1, wherein the registration service is computer-implemented on a component of a public key infrastructure of the technical installation.

3. The control system as claimed in claim 1, wherein the registration service is computer-implemented on a terminal of the process installation.

4. The control system as claimed in claim 2, wherein the registration service is computer-implemented on a terminal of the process installation.

5. The control system as claimed in claim 1, wherein the registration service includes relationships of trust with the installation component and with at least one of (i) the registration authority and (ii) the certification authority of the process installation; and wherein the relationships of trust are certificate-based.

6. The control system as claimed in claim 1, wherein the registration service is configured to extract, from the first memory or a second memory, the information about which registration authority or which certification authority of the process installation is responsible for the certificate request.

7. The control system as claimed in claim 6, wherein the first memory or the second memory is implemented on a component of a public key infrastructure.

8. The control system as claimed in claim 6, wherein the first memory or the second memory is implemented on the engineering station server or on the operator station server of the control system.

9. The control system as claimed in claim 6, wherein the first memory or the second memory is implemented on a terminal of the process installation.

10. The control system as claimed in claim 6, wherein the process installation comprises a chemical, pharmaceutical, petrochemical installation, or an installation from the food and drinks industry.

11. An automated method for transferring a certificate request from an installation component of a process installation, which includes a computer-implemented registration service, to a registration authority or a certification authority of the process installation, an engineering station server including a processor and memory and an operator station server including a processor and memory, said method comprising:

receiving, via the registration service, a certificate request from an installation component of the process installation, the certificate request comprising information regarding an identity of the installation component;

extracting, via the registration service, information from a first memory about which certificates of the installation component are assignable and are to be assigned;

determining, via the registration service, based on a linking of the information regarding the identity of the installation component and the information, extracted from the first memory, about the certificates which have already been assigned, are assignable or are to be assigned, the type of the certificate request, the type representing an initial certificate request or a request for certificate renewal, and which registration authority or which certification authority of the process installation is responsible for the certificate request;

transferring, via the registration service, the certificate request of the installation component together with information about the type of the certificate request to the responsible registration authority or the responsible certification authority, the registration service utilizing the information extracted from the first memory to transform the certificate request from a rudimentary format into a more comprehensive format which includes a type of the certificate request; and routing an issued certificate to the requesting installation component of the process installation subsequent.

12. The method as claimed in claim 11, wherein the registration service is computer-implemented on a component of a public key infrastructure of the process installation.

13. The method as claimed in claim 11, wherein the registration service is computer-implemented on a terminal of the process installation.

14. The method as claimed in claim 12, wherein the registration service is computer-implemented on a terminal of the process installation.

15. The method as claimed in claim 11 wherein the registration service includes relationships of trust with the installation component and with at least one of (i) the registration authority and (ii) the certification authority of the process installation; and wherein the relationships of trust are certificate-based.

16. The method as claimed in claim 12, wherein the registration service includes relationships of trust with the installation component and with at least one of (i) the registration authority and (ii) the certification authority of the process installation; and wherein the relationships of trust are certificate-based.

17. The method as claimed in claim 13, wherein the registration service includes relationships of trust with the installation component and with at least one of (i) the registration authority and (ii) the certification authority of the process installation; and wherein the relationships of trust are certificate-based.

18. The method as claimed in claim 11, wherein the registration service extracts, from the first memory or a second memory, the information about which registration authority or which certification authority of the process installation is responsible for the certificate request.

19. The method as claimed in claim 11, wherein the first memory or the second memory is implemented on a component of a public key infrastructure.

20. The method as claimed in claim 11, wherein the first memory or the second memory is implemented on the engineering station server or on the operator station server of the control system.

21. The method as claimed in claim 11, wherein the first memory or the second memory is implemented on a terminal of the process installation.

22. The control system of claim 1, wherein the control system operates the process installation.

* * * * *